United States Patent [19]

Keller

[11] Patent Number: 4,771,840
[45] Date of Patent: Sep. 20, 1988

[54] ARTICULATED POWER-DRIVEN SHOPPING CART

[75] Inventor: Richard A. Keller, Hartland, Wis.

[73] Assignee: Orthokinetics, Inc., Waukesha, Wis.

[21] Appl. No.: 38,538

[22] Filed: Apr. 15, 1987

[51] Int. Cl.⁴ ............................................. B62D 5/04
[52] U.S. Cl. .................................. 180/11; 180/14.1; 180/19.2; 280/33.99 A; 280/400; 280/DIG 4
[58] Field of Search ............. 180/11, 14.1, 14.2, 180/65.1, 19.2, 21, 210, 908, 12, 13; 280/33.99 A, 87.1, DIG. 4, DIG. 5, 32.7, 400

[56] References Cited

U.S. PATENT DOCUMENTS

| | | | |
|---|---|---|---|
| 2,354,576 | 7/1944 | Clark | 280/2 |
| 2,867,449 | 1/1958 | Shawver | 180/11 X |
| 3,190,386 | 6/1965 | Swinny | 180/19.2 |
| 3,524,512 | 8/1970 | Voeks et al. | 180/14.1 |
| 3,575,250 | 4/1971 | Dykes | 180/11 |
| 4,020,916 | 5/1977 | Noble | 180/65.1 |
| 4,570,739 | 2/1986 | Kramer | 180/65.1 X |
| 4,633,962 | 1/1987 | Cox et al. | 180/65.1 |

Primary Examiner—John J. Love
Assistant Examiner—Mitchell J. Hill
Attorney, Agent, or Firm—Fuller, Puerner & Hohenfeldt

[57] ABSTRACT

An articulated shopping cart-tractor unit with a seat is provided for the handicapped. The tractor unit is connected to a conventional shopping cart by a bracket and coupling.

5 Claims, 1 Drawing Sheet

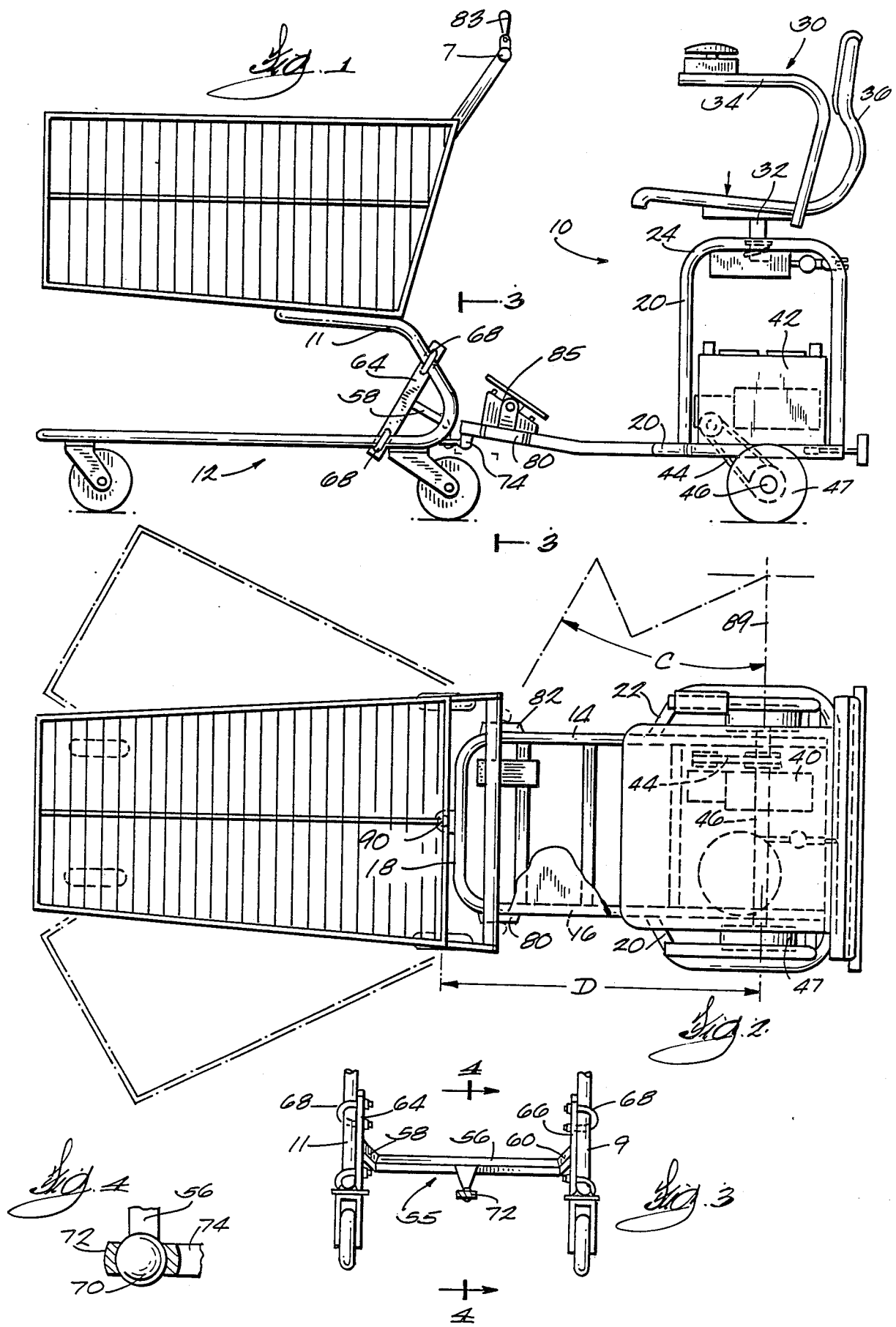

ARTICULATED POWER-DRIVEN SHOPPING CART

FIELD OF THE INVENTION

The invention relates to a tractor unit for a supermarket shopping cart.

BACKGROUND OF THE INVENTION

The various motorized wheelchairs on the market of the conventional construction, or three-wheeled variety, have afforded new mobility to the handicapped. There is a need for motorized wheelchairs or vehicles which include a cart or basket for storage while shopping for people that require such a vehicle. Various shopping carts have been developed. U.S. Pat. Nos. 4,020,916, 3,524,512 and 3,190,386 all show arrangements for propelling shopping carts. The '512 and '916 patents provide a seat for the operator of the vehicle. Both provide electric motors for propelling the shopping carts. It is not believed that the appliances illustrated have a sufficiently small turning radius to afford good maneuverability in confined areas. Accordingly, the usefulness and convenience of such devices is not believed to be optimum.

SUMMARY OF THE INVENTION

The invention provides a tractor power unit which is connected to a conventional shopping cart by an articulated connection which provides a small turning radius to provide good maneuverability.

The coupling between the shopping cart and tractor accommodates roll, pitch and yaw motions of the cart relative to the tractor unit. This is necessary to maintain contact of the drive wheels with the ground or surface or ramp transitions and permit steering of the cart. The frame of the tractor unit is provided with bumpers depending from the foot platform on the frame which engage the rear frame members of the shopping cart to limit turning yaw angularity to plus or minus 30° with respect to the straight line axis of movement.

The tractor unit is provided with a seat with a center of gravity located forwardly of the power axis to put a downward load on the coupling to minimize roll or vertical angulation between the cart and tractor unit during operation.

A coupling frame is easily adapted to fit existing shopping carts without modification thereof to facilitate connection in use of the combination.

DESCRIPTION OF THE DRAWINGS

FIG. 1 is a side elevational view of the shopping cart and tractor unit connected thereto of the invention;

FIG. 2 is a plan view of the shopping cart illustrated in FIG. 1;

FIG. 3 is an enlarged view of the coupling means between the shopping cart and frame; and FIG. 4 is a view along line 4—4 of FIG. 3.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, the tractor propulsion unit 10 is shown connected to a conventional shopping cart 12. The tractor unit 10 includes a frame with generally horizontal frame components formed from tubing. The horizontal frame components comprise spaced tubing runs 14 and 16 and a front tubing run 18. U-shaped vertical extending tubing runs 20 and 22 on each side of the tractor include upper horizontal runs 24 which support a seat assembly 30 which includes a seat pivot 32. The seat can be provided with arm rests 34 and a back 36. The horizontal frame portions support an electric motor and drive unit 40 and a battery 42. The drive unit is coupled by drive means 44 which can include a differential to drive an axle 46 which forms the drive or propulsion axis 89. The wheels 47 are desirably both driven through a differential.

Means are provided for coupling the propulsion unit or tractor unit 10 to the shopping cart 12. In the disclosed construction, the means includes a U-shaped bracket 55 with a generally horizontal portion 56 connected to or integral with leg portions 58 and 60. The leg portions 58 and 60 are each welded to clamping member 64, 66 which are provided with U-bolts 68 which are clamped around the horizontal and upwardly extending runs 9 and 11 of the shopping cart as illustrated in FIGS. 1 and 3. Articulated movement is provided by a ball joint with a male member 70 which is connected to the bracket 56 and a female member 72 which is connected by a bracket 74 to the forward frame member 18. The coupling means must afford roll, pitch and yaw of the shopping cart with respect to the tractor unit to accommodate uneven floor surfaces. The driving force is applied to the shopping cart through the ball coupler. Steering is accomplished by pivoting the cart's rear wheels about the coupling means using the shopping cart handle 7 to input steering force.

As illustrated in FIG. 4, the pivot axis 90 forms an angle C with respect to the drive axis 89. The distance D between the drive axis and pivot axis 90 determines the turning radius. The shorter the turning radius, the more maneuverable the combination of the shopping cart and tractor unit. It has been found that a distance D of 26 inches provides an effective turning radius to accomplish the intended objectives and to afford making a U-turn from one aisle to another without adjustment. Typical aisle centerlines in supermarkets have a spacing of 8–10 feet. A distance D of 26 inches accommodates that spacing.

Bumpers 80 and 82 on the frame or platform limit the angularity of the turning angle to avoid jackknifing or pinch points between the cart and the tractor unit.

The motor speed is controlled by either hand switch 83 (FIG. 1) or foot controls 85. An electronic pulse-width modulated control gradually accelerates and decelerates the drive wheels, providing regenerative braking and dynamic braking. An electromagnetically released, spring set mechanical brake holds the tractor unit and shopping cart on inclines or when parked and provides a fail safe braking system in case of electrical power failure. Speed can be controlled to preset levels, the lower for general public use and the higher for skilled operators during maintenance operations, etc.

I claim:

1. The combination of a shopping cart having a frame with handle portions and front and rear wheel casters for supporting the cart above an operating surface and a tractor unit having a frame;

wheels supporting said tractor frame above an operating surface;

power means for driving at least one of said tractor wheels to propel said tractor unit along the operating surface;

coupling means for coupling said power unit to said shopping cart frame, the coupling means comprising a ball joint male member connected to the shopping cart frame proximate the rear wheel casters and a ball socket female member mounted to the tractor unit frame in coupled engagement with the shopping cart ball joint male member to thereby provide unhindered yaw, pitch and roll movements between said coupled cart and tractor unit;

said coupling means defining a pivot axis; and said tractor wheels defining a power axis; and wherein the distance between the pivot axis and the power axis is dimensioned to afford a turning radius adequate to make a continuous U-turn from one aisle to an adjacent aisle in a supermarket.

2. The combination of claim 1 wherein said tractor unit frame includes a bumper fastened to each side of said frame and located thereon so as to coact with predetermined portions of the shopping cart frame to limit turning yaw angularity with respect to the straight line axis of movement to prevent jackknifing of the tractor unit with respect to the cart but afford angular displacement between the tractor unit and the cart to achieve the optimum turning radius.

3. The combination of claim 2 wherein said frame includes a platform for the feet of the operator and the frame includes a seat with the seat positioned with respect to the power axis to position the occupant of the seat to provide a center of gravity forward of the power axis to put a downward load on the coupling means to minimize pitch of said tractor unit during operation of said combination.

4. The improvement of claim 3 wherein said seat is pivotally mounted of said frame to afford movement of the occupant with respect to the tractor to enable a standing position to reach up on shelves in the supermarket, but limits rotation of the seat to prevent shifting of the center of gravity to a point rearwardly of the pivot axis.

5. The combination of a shopping cart having a basket and having a frame with handle portions and front wheel casters for supporting the shopping cart above an operating surface, said frame including horizontal runs for supporting casters and upwardly extending frame runs supporting said basket and a tractor unit having a frame;

wheels supporting said tractor unit frame above an operating surface;

power means for driving at least one of said wheels to propel said tractor unit along the operating surface;

coupling means for coupling said power unit to said shopping cart frame to provide yaw, pitch and roll movements of said coupled cart and tractor unit;

said coupling means defining a pivot axis and said coupling means including a generally U-shaped bracket with leg portions which fit within said shopping cart frame and clamping members fixed to said leg portions, said clamping portions being clamped by U-bolts to said horizontal and upwardly extending frame runs.

* * * * *